US005738053A

United States Patent [19]
Kato

[11] Patent Number: 5,738,053
[45] Date of Patent: Apr. 14, 1998

[54] MALFUNCTION DETECTION APPARATUS FOR VALVE TIMING CONTROL DEVICE FOR ENGINE

[75] Inventor: Senji Kato, Aichi-ken, Japan

[73] Assignee: Toyota Jidosha Kabushiki Kaisha, Toyota, Japan

[21] Appl. No.: 700,889

[22] Filed: Aug. 21, 1996

[30] Foreign Application Priority Data

Aug. 25, 1995 [JP] Japan .................................. 7-217697

[51] Int. Cl.⁶ ........................ F01L 1/34; F02D 13/02
[52] U.S. Cl. ........................ 123/90.15; 123/90.17
[58] Field of Search ............... 123/90.15, 90.16, 123/90.17

[56] References Cited

U.S. PATENT DOCUMENTS

| | | | |
|---|---|---|---|
| 4,996,954 | 3/1991 | Seki et al. | 123/90.15 |
| 5,469,818 | 11/1995 | Yoshioka et al. | 123/90.15 |
| 5,494,008 | 2/1996 | Ohkawa et al. | 123/90.15 |
| 5,529,034 | 6/1996 | Sone et al. | 123/90.17 |

FOREIGN PATENT DOCUMENTS

| | | |
|---|---|---|
| 58-158335A | 9/1983 | Japan . |
| 59-105911A | 6/1984 | Japan . |
| 7-119526A | 5/1995 | Japan . |

Primary Examiner—Weilun Lo
Attorney, Agent, or Firm—Kenyon & Kenyon

[57] ABSTRACT

A valve timing control device includes a hydraulic variable valve timing mechanism (VVT). The VVT alters valve timing of the intake valve and/or the exhaust valve. An electronic control unit (ECU) controls the VVT for obtaining overlap suitable for the running condition of the engine, that is, the VVT allows the actual phase angle of the valve timing to approach the target phase angle suitable for the running condition of the engine. A malfunction detection apparatus including the ECU detects a malfunction of the valve timing control device. The ECU judges whether the engine is stalled. The ECU determines whether the actual phase angle of the valve timing corresponds to a specific state, which suggests a malfunction of the valve timing control device. When detecting the stalling of the engine, the ECU detects whether it has judged that the actual phase angle of the valve timing corresponds to the specific state. The ECU then determines that there is a malfunction of the valve timing control device when the actual phase angle of the valve timing corresponds to the specific state.

23 Claims, 9 Drawing Sheets

MALFUNCTION DETECTION APPARATUS FOR VALVE TIMING CONTROL DEVICE FOR ENGINE

BACKGROUND OF THE INVENTION

1. Field of the Invention

The present invention relates generally to a valve timing control device that controls the timing of the intake valve and/or the exhaust valve of an engine in accordance with the running condition of the engine. More particularly, the present invention pertains to a malfunction detection apparatus for detecting a malfunction in the control device.

2. Description of the Related Art

A conventional engine generally has intake and exhaust valves provided in a cylinder head. The intake and exhaust valves selectively open and close intake ports and exhaust ports leading into combustion chambers. The timing of the valves is synchronized with the rotational phase of a crankshaft, or the reciprocal movement of pistons. The amount of air drawn into the combustion chambers (intake amount) and the amount of exhaust gas discharged from the combustion chambers (exhaust amount) are determined by the opening of a throttle valve or the rotating speed of a crank shaft. In other words, the intake amount and the exhaust amount are determined by the engine speed.

Various control devices that enable alteration of the valve timing to adjust the intake and exhaust amount with a greater degree of freedom have recently become available. Such devices typically include a variable valve timing mechanism for alteration of the valve timing and a computer to control the operation of the timing mechanism. The computer controls the valve timing of the intake valve and/or the exhaust valve in accordance with the running condition of the engine to adjust the valve overlap of the intake and exhaust valves. This optimizes the intake amount and/or the internal exhaust gas recirculation (EGR), that is, exhaust gas drawn back to the combustion chamber after being exhausted therefrom. Thus, the power, the emissions and the mileage of the engine are improved.

Some of the above devices include a variable valve timing mechanism for continuously adjusting the valve timing. Devices of this type have a computer for computing a required value of valve timing, that is, the value of target displacement angle. The computer also monitors the value of the valve timing, that is, the value of the actual displacement angle. The computer executes feedback control of the variable valve timing mechanism for matching the value of the actual displacement angle to the value of the target displacement angle. In this specification, the displacement angle refers to difference between the rotational phase of a crank shaft and the rotational phase of a cam shaft. A precise detection of the actual displacement angle is necessary for executing the feedback control properly.

Japanese Unexamined Patent Publication No. 59-105911 discloses one example of apparatuses for detecting the actual displacement angle in a device that continuously adjusts the valve timing. This apparatus includes a first output means (a magnetometric sensor), a second output means (a magnetometric sensor) and a control circuit. The first output means outputs a first pulse signal at every rotation of a crank shaft, while the second output means outputs a second pulse signal at every rotation of a cam shaft. The control circuit detects the actual displacement angle, which is the angle interval between the first pulse signal and the second pulse signal. The control circuit adopts the value of the detected actual displacement angle for controlling the valve timing.

Under abnormal conditions that prevent a variable valve timing mechanism from operating in an intended manner, the value of the actual displacement angle, which is related to valve timing, does not match the target displacement angle. Therefore, a trouble may occur in the engine. For example, if a variable valve timing mechanism stops operating when the actual displacement angle is most advanced and the valve overlap is the greatest, the amount of the internal EGR becomes improper, resulting in an unstable combustion of the air-fuel mixture. This may affect the drivability of the engine. Therefore a malfunction of a variable valve timing mechanism needs to be effectively dealt with. Specifically, it needs to be detected for adjusting the control parameters of the engine or for replacing the parameters with a set of new values.

One of the methods to detect a malfunction of the variable valve timing mechanism is to judge whether the deviation of the value of the actual displacement angle is greater than the value of the target displacement angle.

The above method needs to take the response time of the variable valve timing mechanism into account. In other words, a precise judgment of an excessive deviation of the displacement angles made only after detecting the excessive deviation for a predetermined period of time. This means that a precise execution of a malfunction detection of this method requires a certain period of time. Therefore, an engine may stall immediately if a variable valve timing mechanism stops operating when the engine load is small and the period of overlapping is long, since the malfunction of the mechanism cannot be detected right away. Detection of a malfunction of the mechanism is impossible after the engine is stalled. A fail-safe program for facilitating restarting the engine is designed to be carried out in response to a signal indicating a malfunction of the variable valve timing mechanism. Restarting an engine without detecting a malfunction of the variable valve timing mechanism after engine stall is therefore difficult.

SUMMARY OF THE INVENTION

Accordingly, it is a primary objective of the present invention to provide a malfunction detection apparatus for a valve timing control device for an engine. The apparatus is designed for detecting a malfunction of a valve timing control device based on a plurality of states of the engine including stalling of the engine. The apparatus is able to detect a malfunction of the valve timing control device after the engine is stalled.

To achieve the foregoing and other objects and in accordance with the purpose of the present invention, a malfunction detection apparatus for a valve control device for an engine is provided. The engine has an air intake passage for introducing air to a combustion chamber and an air exhaust passage for exhausting gas from the combustion chamber. The air intake passage and the air exhaust passage have an intake valve and an exhaust valve respectively. The valves are alternately opened and closed with a valve timing synchronized with the rotation of a crank shaft of the engine. The control device has a first adjusting means for adjusting the valve timing of at least one of the intake valve and the exhaust valve, a first detecting means for detecting a running condition of the engine, wherein the running condition includes rotation speed of the crank shaft as a parameter, a computing means for computing a target value representing the valve timing based on the detected running condition, a second detecting means for detecting an actual value representing the valve timing adjusted by the first adjusting means, and a control means for controlling the first adjusting means to converge the detected actual value to the computed target value so as to obtain a valve timing according to a condition of the engine. The apparatus includes a first deciding means for deciding whether a stall has occurred in the engine based on the detected running condition, a second deciding means for deciding whether the detected actual value corresponds to a specific state indicating a possibility of a malfunction related to the control device, and third deciding means for deciding that the malfunction related to the control device has occurred when the first deciding means decides that a stall has occurred in the engine, and the second deciding means decides that the detected actual value corresponds to a specific state indicating a possibility of a malfunction related to the control device.

BRIEF DESCRIPTION OF THE DRAWINGS

The features of the present invention that are believed to be novel are set forth with particularity on the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of a malfunction detection apparatus for a valve timing control device for an engine according to the present invention will be described below with reference to FIGS. 1 to 9. The apparatus is embodied in a gasoline engine system.

Figure 1:
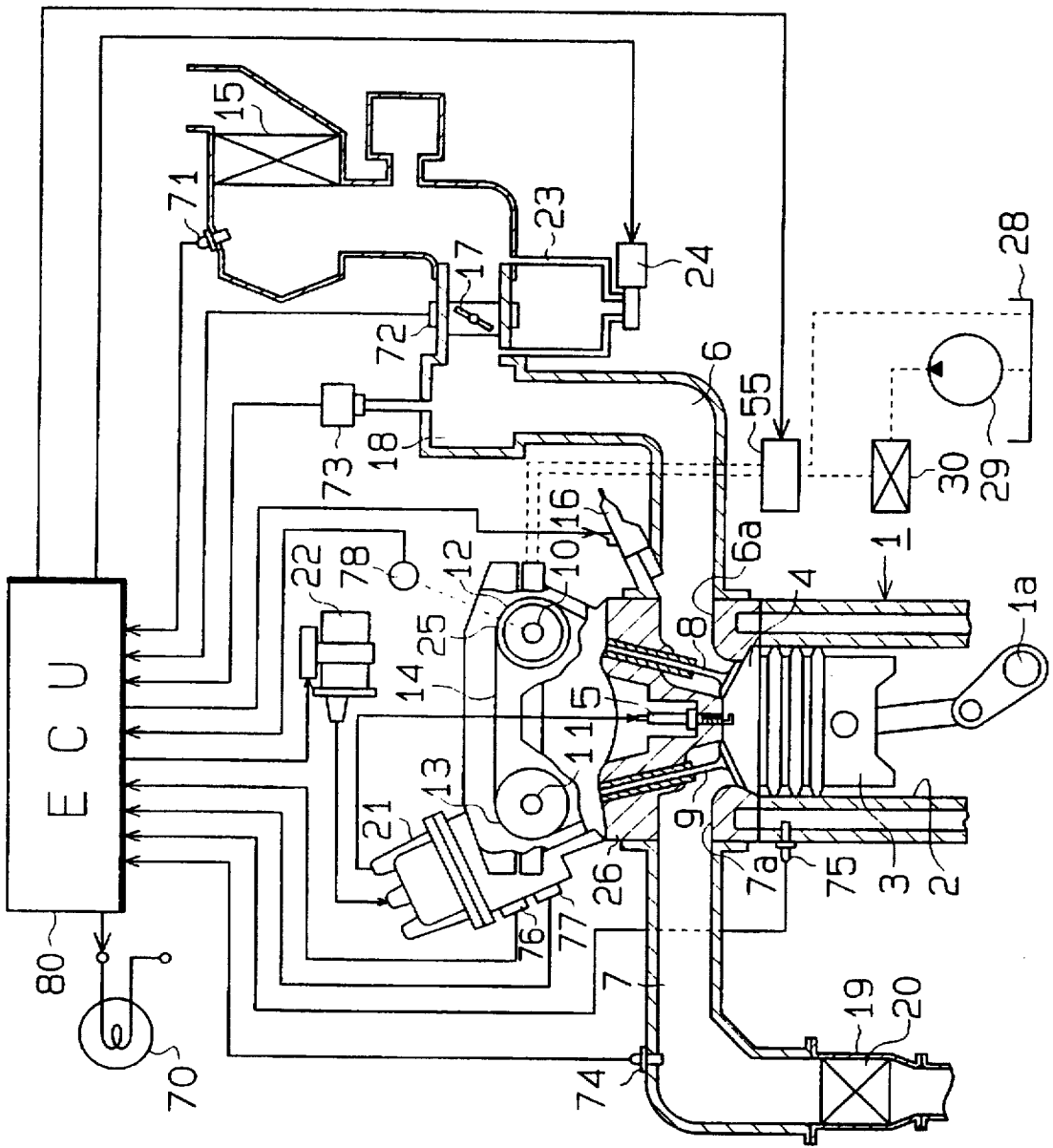
FIG. 1 is a schematic diagram illustrating a gasoline engine system.

FIG. 1 illustrates the schematic structure of a gasoline engine system including a valve timing control device and a malfunction detection apparatus according to the first embodiment of the present invention. An engine 1 has a plurality of cylinders 2, which retain pistons 3. The pistons 3 are coupled to a crank shaft 1a and are movable up and down in the associated cylinders 2. In each cylinder 2, a combustion chamber 4 is located above the piston 3. An ignition plug 5 is provided in each combustion chamber 4 for igniting air-fuel mixture. An intake port 6a and an exhaust port 7a are provided in association with each combustion chamber 4. The ports 6a and 7a constitute a part of an air-intake passage 6 and a part of an exhaust passage 7. An intake valve 8 and an exhaust valve 9 provided in association with each combustion chamber 4 selectively open and close the respective ports 6a and 7a. The valves 8 and 9 function based on the rotations of cam shafts 10 and 11, respectively. Timing pulleys 12 and 13, which are respectively provided at the distal ends of the cam shafts 10 and 11, are coupled to the crank shaft 1a by a timing belt 14.

When the engine 1 is running, the torque of the crank shaft 1a is transmitted with the timing belt 14 and the timing pulleys 12 and 13 to the cam shafts 10 and 11, actuating the valves 8 and 9. The valves 8 and 9 each function at a predetermined timing in synchronism with the rotation of the crank shaft 1a or in synchronism with a sequence of operation strokes (the suction stroke, the compression stroke, the combustion and expansion stroke and the exhaust stroke) according to the up and down movement of each piston 3.

An air cleaner 15 provided at the intake side of the air-intake passage 6 cleans the outside air drawn into the air-intake passage 6. Injectors 16 provided near the respective intake ports 6a inject fuel into the intake ports 6a. When the engine 1 runs, the air is drawn via the air cleaner 15 into the air-intake passage 6. At this time, the fuel injected from each injector 16 is mixed with the air, and this air-fuel mixture is drawn into the associated combustion chamber 4 when the associated intake port 6a is opened by the intake valve 8 during the suction stroke. The air-fuel mixture supplied into the combustion chamber 4 is ignited and burned by the associated ignition plug 5. This moves the piston 3 to rotate the crank shaft 1a, generating the driving power in the engine 1. The exhaust gas after combustion is discharged out of the combustion chamber 4 via the exhaust passage 7 when the exhaust port 7a is opened by the exhaust valve 9 in the exhaust stroke.

A throttle valve 17 provided midway in the air-intake passage 6 responds to the manipulation of an acceleration pedal (not shown). The amount of air taken into the air-intake passage 6, i.e., the air-intake amount Q is controlled by adjusting the opening of the valve 17. A surge tank 18 provided downstream of the valve 17 dampens the pulsation of air flowing through the air-intake passage 6. An air temperature sensor 71, provided in the vicinity of the air cleaner 15, detects an intake-air temperature THA and produces a signal corresponding to the detected value. A throttle sensor 72, provided in the vicinity of the throttle valve 17, detects the opening TA, of the valve 17 (throttle opening) and produces a signal corresponding to the detected value. When the throttle valve 17 is fully closed, the throttle sensor 72 detects it and sends a signal. An intake air pressure sensor 73, provided in the surge tank 18, detects an intake-air pressure PM and produces a signal corresponding to the detected value.

A catalytic converter 19, provided midway in the exhaust passage 7, cleans the exhaust gas with an incorporated three way catalyst 20. Further, an oxygen sensor 74 provided midway in the exhaust passage 7 detects the oxygen density Ox in the exhaust gas and produces a signal corresponding to the detected value. A coolant temperature sensor 75 provided in the engine 1 detects the temperature THW of the coolant in the engine 1 and produces a signal corresponding to the detected value.

A distributor 21 distributes a high voltage, released from an igniter 22, as an ignition signal to activate the individual ignition plugs 5. The ignition timing of each ignition plug 5 is therefore determined by the timing at which the high voltage is released from the igniter 22.

A rotor (not shown) incorporated in the distributor 21 rotates in synchronism with the rotation of the crank shaft 1a with the cam shaft 11. An engine speed sensor 76 provided in the distributor 21 detects the rotational speed of the engine 1 (engine speed) NE in accordance with the rotation of the rotor and sends the detected value as a pulse signal. A timing sensor 77 also provided in the distributor 21 detects a reference position GP of the rotational phase of the crank shaft 1a (crank angle CA) at a predetermined rate in accordance with the rotation of the rotor and also sends the detected value as a pulse signal. In this embodiment, the crank shaft 1a rotates twice for one sequence of four operational strokes of the engine 1, and the engine speed sensor 76 outputs one pulse signal every crank angle CA of 30 degrees while the crank shaft 1a rotates twice. The timing sensor 77 sends one pulse signal every crank angle CA of 360 degrees.

The air intake passage 6 has a bypass 23. The bypass 23 provides a detour around the throttle valve 17. The airflow in the bypass 23 is controlled by an idle speed control valve (ISCV) 24 provided therein. The ISCV 24 has a solenoid. The ISCV 24 is activated for stabilizing the engine 1 when the throttle valve 17 is closed, i.e., when the engine 1 is idling. The ISCV 24, which is controlled by predetermined command signals, controls the amount of the intake air Q drawn into the combustion chamber 4 via the bypass 23. The engine idling speed NE is thus controlled.

A variable valve timing mechanism (hereinafter simply referred to as "VVT") 25, which is provided in the timing pulley 12, alters the actuation timing of the intake valve 8. The structure of the VVT 25, which is a hydraulic type, will be described below in detail.

Figure 2:
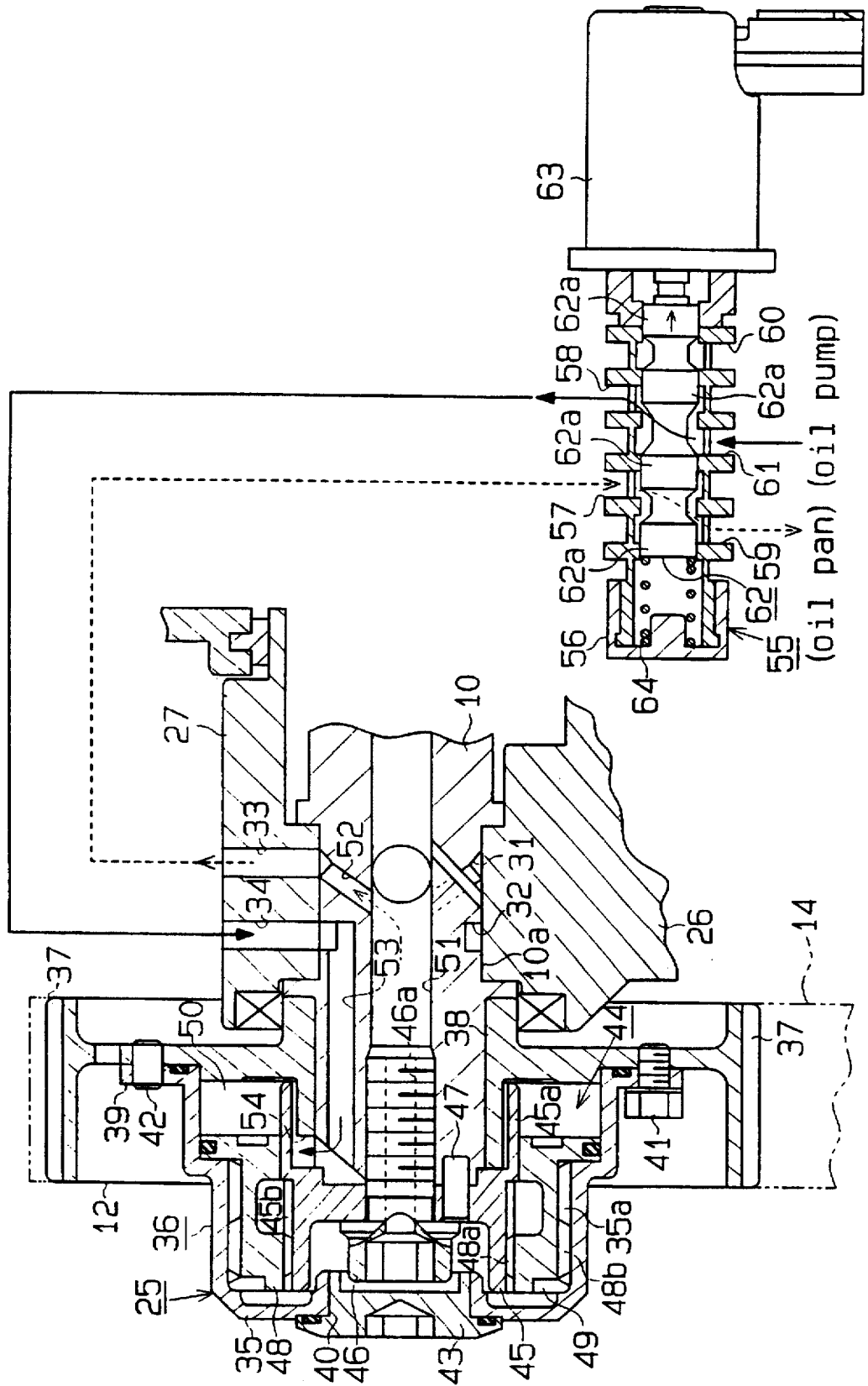
FIG. 2 is a sectional view illustrating the structure and operation of a variable valve timing mechanism (VVT) and a linear solenoid valve (LSV)
Figure 3:
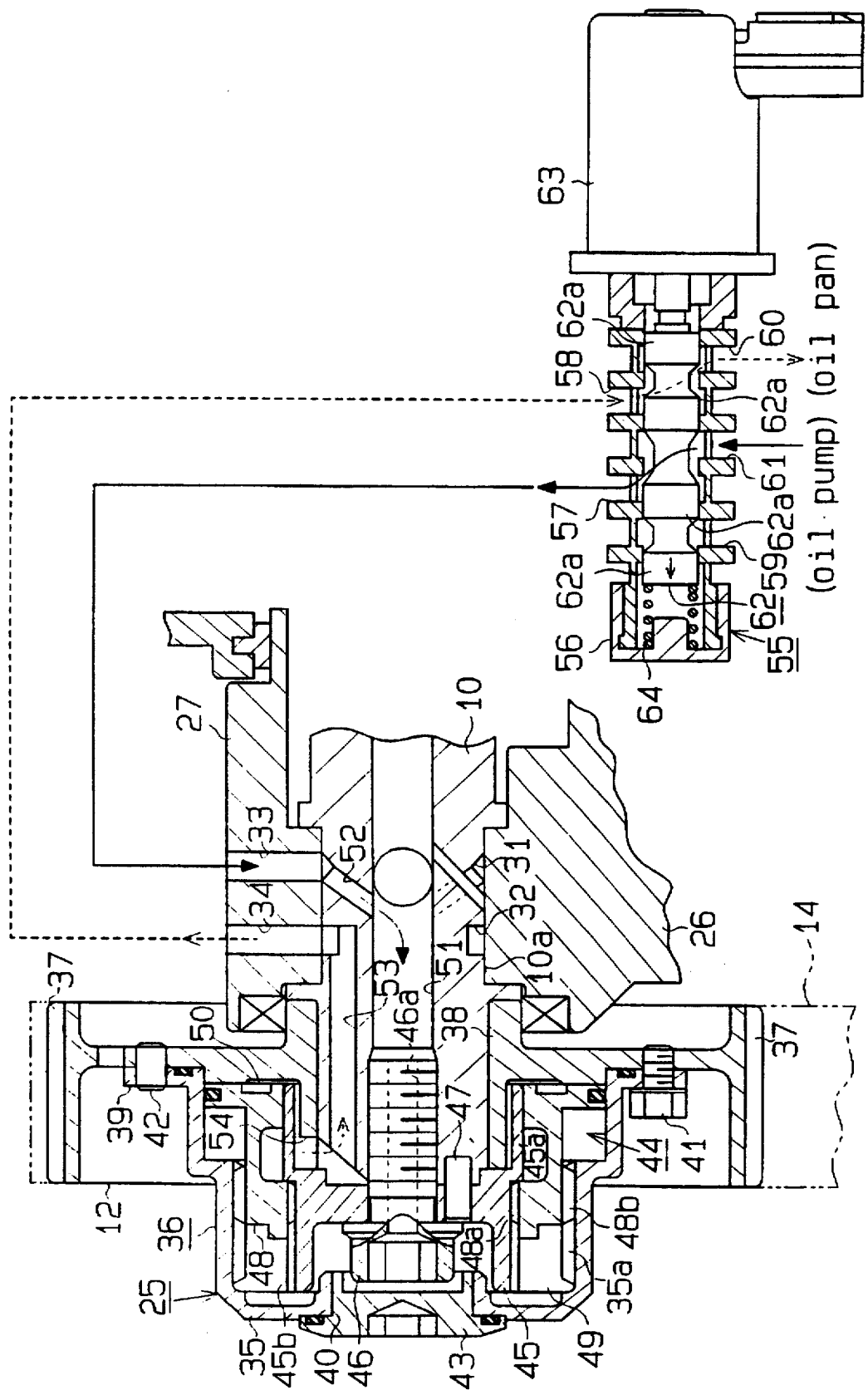
FIG. 3 is a sectional view illustrating the structure and operation of the VVT and the LSV.

FIGS. 2 and 3 depict the structures of the VVT 25 and a linear solenoid valve (LSV) 55 accompanying the VVT 25. A cylinder head 26 and bearing cap 27 of the engine 1 rotatably support the cam shaft 10 with a journal 10a. The VVT 25 is integrally provided with the timing pulley 12 at the distal end of the cam shaft 10. Two oil grooves 31 and 32 provided in the journal 10a extend along the outer surface of the journal 10a. Oil passages 33 and 34 provided in the bearing cap 27 supply lubricating oil to the journal 10a and the oil grooves 31 and 32. As shown in FIG. 1, an oil pan 28, an oil pump 29 and an oil filter 30 provided in the engine 1 constitute a lubricating device for supplying lubricating oil to various locations in the engine 1. This lubricating device also provides the VVT 25 with hydraulic pressure through the lubricating oil. The LSV 55 adjusts the hydraulic pressure supplied to the VVT 25. The lubricating device and the LSV 55 constitute a hydraulic pressure provide device.

In response to the running of the engine 1, the oil pump 29 pumps the lubricating oil out of the oil pan 28 is discharges it. The discharged lubricating oil passes through the oil filter 30 and is selectively supplied under pressure through the individual oil passages 33 and 34 to the oil grooves 31 and 32 and the journal 10a by the LSV 55.

The timing pulley 12, having an approximate disk shape, and a cylindrical cover 35, which is attached to the pulley 12, constitute a housing 36. The cover 35 covers one side of the pulley 12 and the distal end of the cam shaft 10. The pulley 12 has a plurality of external teeth 37 on its outer surface and a boss 38 in the center. The pulley 12, which is journalled at the boss 38 to the cam shaft 10, is rotatable relative to the cam shaft 10. The timing belt 14 is coupled to the external teeth 37.

The cover 35 has a flange 39 on its peripheral wall and a hole 40 at its center. A plurality of bolts 41 and pins 42 fasten the flange 39 to one side of the pulley 12. A detachable cap 43 is mounted in the hole 40. The cover 35 has a plurality of inner teeth 35a on its inner surface.

A space 44 is defined between the pulley 12 and the cover 35. A cylindrical inner cap 45 is retained in the space 44. The cap 45 is secured to the distal end of the cam shaft 10 by a hollow bolt 46 and a pin 47. The peripheral wall 45a of the cap 45 encompasses the boss 38. The cap 45 and the boss 38 are relatively rotatable with respect to each other. A plurality of outer teeth 45b are provided on the outer surface of the peripheral wall 45a.

An annular ring gear 48 located between the cover 35 and the cap 45 connects the housing 35 with the cam shaft 10. The ring gear 48 is retained in the space 44 and is movable along the axis of the cam shaft 10. The ring gear 48 has a plurality of helical teeth 48a, 48b on its inner and outer peripheries. The inner teeth 48a of the ring gear 48 are meshed with the outer teeth 45b of the cap 45, and the outer teeth 48b of the gear 48 are meshed with the inner teeth 35a of the cover 35. Movement of the ring gear 48 along the cam shaft 10 allows the ring gear 48 to relatively rotate with respect to the cam shaft 10.

Rotation of the pulley 12 rotates the cover 35 and the cap 46, which are connected to each other by the gear. 48. Thus, the cam shaft 10 and the housing 36 rotate integrally with each other.

As shown in FIGS. 2 and 3, the space 44 includes first and second hydraulic pressure chambers 49, 50 which are partitioned by the ring gear 48. The first pressure chamber 49 is defined between the left end of the gear 48 and the bottom wall of the cover 35. The second pressure chamber 50 is defined between the right end of the gear 48 and the pulley 12.

An oil passage 51 extends inside the cam shaft 10 along its axis to supply lubricating oil to the first pressure chamber 49. The passage 51 is connected with the first pressure chamber 49 by a hole 46a extending through the bolt 46. The passage 51 is connected to the oil groove 31 through an oil hole 52 extending in the radial direction of the cam shaft 10.

An oil passage 53, extending parallel to the oil passage 51 inside the cam shaft 10, supplies lubricating oil to the second pressure chamber 50. An oil hole 54 formed in the boss 38 connects the second pressure chamber 50 with the passage 53.

In the above structure, the oil passage 33, the oil hole 52, the oil passage 51, the hole 46a, etc. constitute a first pressurizing passage, which applies hydraulic pressure to the first pressure chamber 49 with lubricating oil. The oil passage 34, 53, the oil hole 54, etc. constitute a second pressurizing passage, which supplies hydraulic pressure to the second pressure chamber 50 with lubricating oil. An LSV 55, provided midway in the first and second pressurizing passages functions based on duty signals. Duty control of the opening of the LSV 55 adjusts the hydraulic pressure applied to the pressure chambers 49, 50. The connecting relation between the LSV 55 and the oil pan 28, oil pump 29, and oil filter 30 is shown in FIG. 1.

As shown in FIGS. 2 and 3, a casing 56 of the LSV 55 'includes first, second, third, fourth, and fifth ports 57, 58, 59, 60 and 61. The first port 57 is connected to the oil passage 33. The second port 58 is connected to the oil passage 34. The third and fourth ports 59, 60 are connected to the oil pan 28. The fifth port 61 is connected to the discharge side of the oil pump 29 with the oil filter 30 located in between. A stick-like spool 62 provided in the casing 56 has four cylindrical valve bodies 62a. The spool 62 moves reciprocally along its axis. An electromagnetic solenoid 63 provided on the casing 56 moves the spool 62 between a first operable position, shown in FIG. 2, and a second operable position, shown in FIG. 3. In FIGS. 2 and 3, when the spool 62 is at the first operable position, the right end of the spool 62 is nearest to the casing 56, i.e., the stroke of the spool 62 is minimum. When the spool 62 is at the second operable position, the left end of the spool 62 is nearest to the casing 56, i.e., the stroke of the spool 62 is maximum. A spring 64 provided in the casing 56 urges the spool 62 toward the first operable position.

As shown in FIG. 3, when the spool 62 is arranged at the second operable position against the urging force of the spring 64, the stroke of the spool 62 is maximized. At this time, the discharge side of the pump 29 is connected with the oil passage 33, and the oil passage 34 is connected to the oil pan 28. This applies hydraulic pressure to the first pressure chamber 49 and thus moves the ring gear 48 in the axial direction while rotating it. Thus, the gear 48 is pushed against the residual oil in the second pressure chamber 50. This drains the oil in the second pressure chamber 50 to the oil pan 28. As a result, the relative rotational phase between the cam shaft 10 and the housing 36 is altered with the phase of the shaft 10 being more advanced than the phase of the housing 36. Consequently, the valve timing of the intake valve 8 is more advanced than the rotational phase of the crank shaft 1a.

Figure 5A:
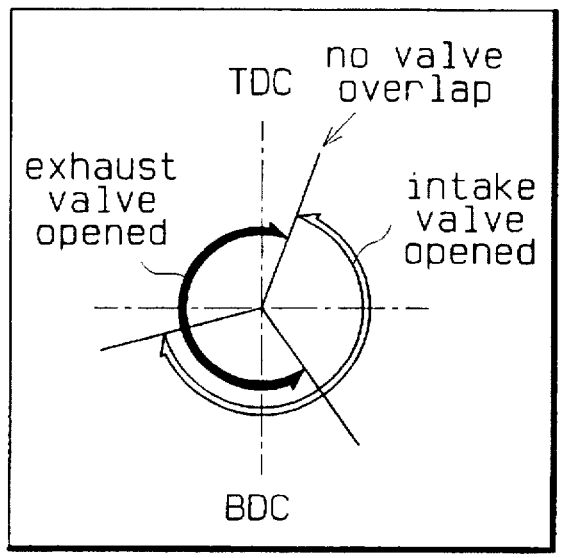
FIG. 5(a) and 5(b) are diagrams explaining the valve overlap change.
Figure 5B:
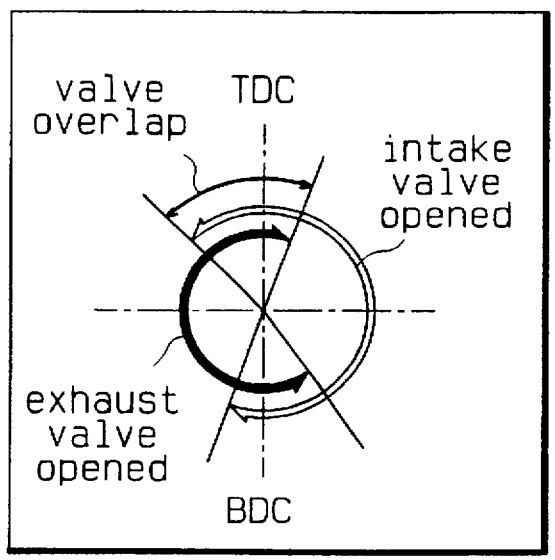

At this time, as shown in FIG. 5(b), the valve timing of the intake valve 8 is relatively advanced and thus the valve overlap of the intake and exhaust valves 8, 9 during the suction stroke becomes relatively greater. By controlling the hydraulic pressure applied to the first pressure chamber 49 in the above manner, the ring gear 48 is moved to a position nearmost to the pulley 12, as shown in FIG. 3. When the gear 48 is at the position nearest to the pulley 12 as in FIG. 3, the valve timing of the intake valve 8 is most advanced and the valve overlap is greatest.

As shown in FIG. 2, when the spool 62 is arranged at the first operable position, the stroke of the spool 62 is minimized. At this time, the discharge side of the pump 29 is connected with the oil passage 34 and the oil passage 33 is connected to the oil pan 28. This provides hydraulic pressure to the second pressure chamber 50 and moves the ring gear 48 in the axial direction while rotating it. Thus, the gear 48 is pushed against the residual oil in the first pressure chamber 49. This drains the oil in the first pressure chamber 49 to the oil pan 28. As a result, the relative rotational phase between the cam shaft 10 and the housing 36 is changed in a direction opposite to the direction when the spool 62 is at the second operable position. In this state, the rotational phase of the cam shaft 10 is delayed from the rotational phase of the housing 36. Consequently, the valve timing of the intake valve 8 is more delayed than the rotational phase of the crank shaft 1a.

In this state, as shown in FIG. 5(a), the valve timing of the intake valve 8 is relatively delayed and thus the valve overlap during the suction stroke becomes relatively smaller. By controlling the hydraulic pressure applied to the second hydraulic pressure chamber 50 in the above manner, the ring gear 48 is moved to a position nearest to the cover 35, as shown in FIG. 2. When the gear 48 is at this position, the valve timing of the intake valve 8 is most delayed, and, in this embodiment, the valve overlap is eliminated.

Arranging the spool 62 at an arbitrary position between the first position and the second position alters the transitional cross sectional area of oil to the hydraulic pressure chambers 49 and 50. This subtly alters the advanced valve timing speed (advanced angle speed) and the delayed valve timing speed (delayed angle speed). Positioning the spool 62 at the approximate midpoint of the first position and the second position disconnects the oil pump 29 and the oil pan 28 from the oil passages 33 and 34. As a result, the hydraulic pressure applied to the chambers 49 and 50 is restricted. This causes the VVT 25 to stop functioning and valve timing to stop altering.

By adequately controlling the VVT 25 in the above manner, the valve timing of the intake valve 8, and consequently, the valve overlap, may be changed continuously (steplessly) within the range between the states shown in FIGS. 5(a) and (b).

As shown in FIG. 1, a cam sensor 78, provided with the cam shaft 10, detects the actual displaced angle VT with respect to the rotation of the shaft 10 and transmits a signal based on the detected value. The cam sensor 78 includes a plurality of equally spaced projections arranged on the shaft 10 and a plurality of pick-up coils arranged in correspondence with the projections. An electromotive force is produced in the pick-up coils when rotation of the cam shaft 10 causes the projections to pass by the coils. The cam sensor 78 transmits a pulse signal which shows the actual displacement angle VT according to the electromotive force.

As shown in FIG. 1, an electronic control unit (ECU) 80 receives the signals transmitted from the sensors 71–78. The ECU 80 controls the injector 16, the igniter 22, ISCV 24, the LSV 55 and a warning lamp 70 in response to the signals for executing fuel injection amount control, ignition timing control, idle speed control and valve timing control.

In this embodiment, fuel injection amount control refers to adjusting the amount of fuel provided into the combustion chamber 4. The amount of the fuel is adjusted by the injector 16. The injector 16 is controlled based on a target value. The target value is computed according to the running condition of the engine 1. The ignition timing control refers to adjusting the ignition timing of the ignition plug 5. The ignition plugs 5 are activated by the igniter 22. The igniters 22 are controlled based on a target value. The target value is calculated according to the running condition of the engine 1. The idle speed control refers to a control of the opening of the ISCV 24 when the engine 1 is idling for converging the engine speed NE to a predetermined value.

The valve timing control refers to altering the valve timing of the intake valve 8 for adjusting the period of the valve overlap. The valve timing is altered by the VVT 25. The VVT 25 is operated by the LSV 55 with hydraulic pressure therefrom. The LSV 55 is controlled according to the running condition of the engine 1. In other words, the LSV 55 alters the valve timing of the intake valve 8 via the VVT 25, thereby adjusting the period of the valve overlap.

In this embodiment, the LSV 55 is controlled based on a predetermined drive duty ratio DVT. The LSV 55 matches the value of the valve timing to a target value via the VVT 25. The drive duty ratio DVT serves as a parameter used in the LSV 55. The drive duty ratio DVT determines the displacement speed of the valve timing without determining the displacement angle of the valve timing. The LSV 55 is controlled based on the drive duty ratio DVT and the spool 62 is moved according to the value of the drive duty ratio DVT. The integral of the value of the drive duty ratio DVT correlates the displacement angle of the valve timing after moving the spool 62.

The ECU 80 detects a malfunction of the valve timing control device based on the detected value from the engine speed sensor 76 and the cam sensor 78. One example of a malfunction of the valve timing control device is the case in which the VVT 25 and the LSV 55 stop operating in a certain state. When detecting such a malfunction, the ECU 80 controls the opening of the. ISCV 24 for executing a fail-safe program. When a malfunction of the valve timing control device stalls the engine 1, the fail-safe program includes control of the ISCV 24 to restart the engine 1.

A warning lamp 70 provided on a panel in the vicinity of the drivers seat is designed to notify the driver of a malfunction of the valve timing control device. The ECU 80 lights the warning lamp 70 when detecting the malfunction and turns off the lamp 70 when there is no malfunction.

Figure 4:
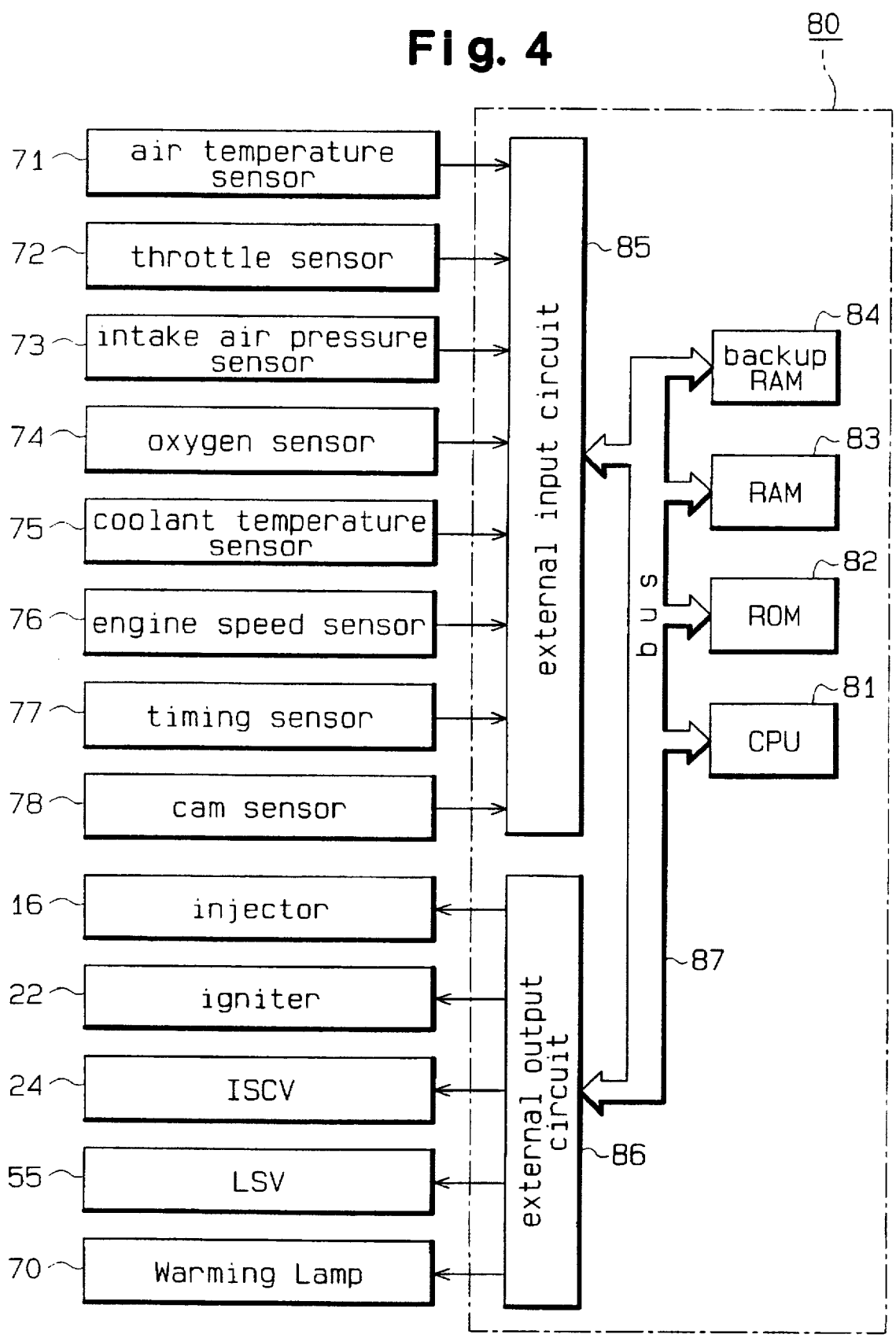
FIG. 4 is a circuit block diagram illustrating an electronic control unit (ECU)

As shown in the block diagram of FIG. 4, the ECU 80 includes a central processing unit (CPU) 81, a read-only memory (ROM) 82, a random access memory (RAM) 83, and a back-up RAM 84. A logical processing unit is constituted in the ECU 80 by connecting the above members 81–84 to an external input circuit 85, including an analog to digital (A/D) converter and an external output circuit 86, with a bus 87. The CPU 81 may also serve as various kinds of counters including an auto increment counter. A predetermined control program is stored in the ROM 82. A processed result of the CPU 81 is temporarily stored in the RAM 83. The back-up RAM 84 saves the stored data. The sensors 71–78 are connected to the external input circuit 85. The members 16, 22, 24, 55 and 70 are connected to the external output circuit 86. Power is supplied to the ECU 80 from a battery (not shown) as a power source. The signals transmitted from the sensors 71–78 through the external input circuit 85 are read by the CPU 81 as input values. The CPU 81 controls the members 16, 22, 24, 55 and 70 through fuel injection amount control, ignition timing control, valve timing control, etc. based on the input values. The ROM 82 stores programs to carry out the various controls.

Figure 7:
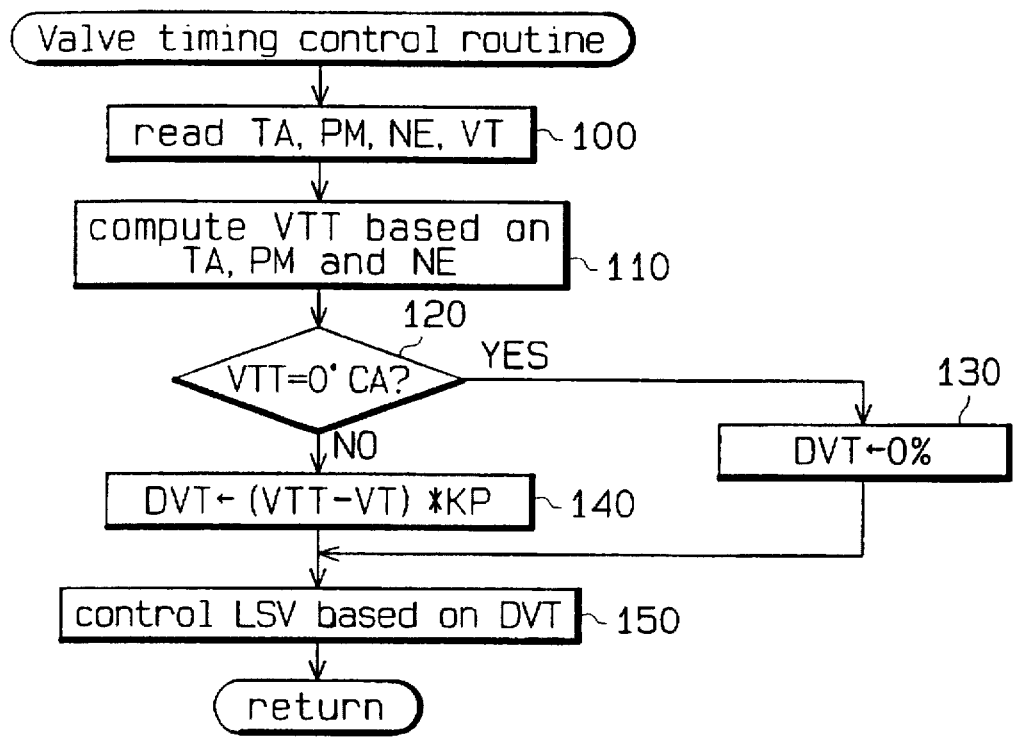
FIG. 7 is a flowchart illustrating a valve timing control routine.

The valve timing control will be described. A flow chart illustrating the "Valve Timing Control Routine" is illustrated in FIG. 7. The ECU 80 executes this routine periodically for every predetermined time period.

When the ECU 80 enters to this routine, in step 100, the ECU 80 reads throttle opening TA, which includes a signal indicating that the throttle valve is completely shut, intake air pressure PM, engine speed NE, and the actual displacement angle VT based on the signals sent from the sensors 72, 73 75, 76, 78.

Figure 6:
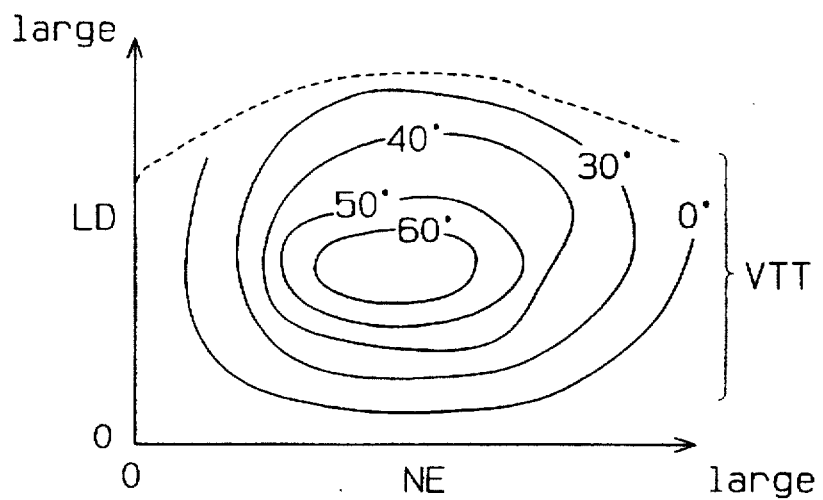
FIG. 6 is a graph of function data related to a target displacement angle (VTT)

In step 110, the ECU 80 computes the value of the target displacement angle VTT for controlling the VVT 25 based on the values of parameters TA, PM and NE transmitted in step 100 in the current routine. The ECU 80 computes the target displacement angle VTT referring to the function data in the graph shown in FIG. 6. In the graph of FIG. 6, the target displacement angle VTT is previously set at a optimal value based on the relation between the load LD of the engine 1 and the engine speed NE. The engine load LD is calculated by using the intake air pressure PM and the engine speed NE as parameters.

An step 120, the ECU 80 judges whether the value of the target displacement angle VTT calculated in the current routine is 0°0 CA, that is, whether the valve timing should be adjusted to the most delayed state, or the most delayed angle. When it is determined that the target displacement angle VTT is 0° CA, the ECU 80 executes the process of steps 130 and 150 to sustain the valve timing at the most delayed angle.

In step 130, the ECU 80 sets the drive duty ratio DVT at 0%. The drive duty ratio DVT is used for duty controlling the LSV 55. In step 150, the ECU 80 duty controls the LSV 55 based on the value of the drive duty ratio DVT, thereby adjusting the displacement angle of the cam shaft 10. The ECU 80 controls the LSV 55 by converting the value of the drive duty ratio DVT, which is 0% in the current routine, into a current value for duty control. This control adjusts the valve timing of the intake valve 8 at the most delayed angle, thereby eliminating the valve overlap. When judging the value of the target displacement angle VTT is not 0° CA in step 120, the ECU 80 proceeds to step 140.

In step 140, the ECU 80 calculates the value of the drive duty ratio DVT based on the following equation (1)

$$DVT=(VTT-VT)*KP \qquad (1)$$

The equation (1) shows that the drive duty ratio DVT is computed by a proportional control. As shown in the equation (1), the value of the drive duty ratio DVT continuously changes proportional to the deviation between the value of target displacement angle VTT and the actual displacement angle VT. The KP in the equation (1) is a constant and is the gain in the proportional control. The drive duty ratio DVT suitable for the running condition of the engine 1 is obtained by multiplying the deviation by the constant KP.

In step 150, the ECU 80 controls the LSV 55 based on the computed DVT. The LSV 55 operates the VVT 25. This means that the LSV 55 indirectly controls the VVT 25 for adjusting the period of the valve overlap. In other words, the ECU 80 controls the VVT 25 such that the actual displacement angle VT approaches the target displacement value VTT for obtaining valve timing suitable for the current running condition of the engine 1.

Figure 9:
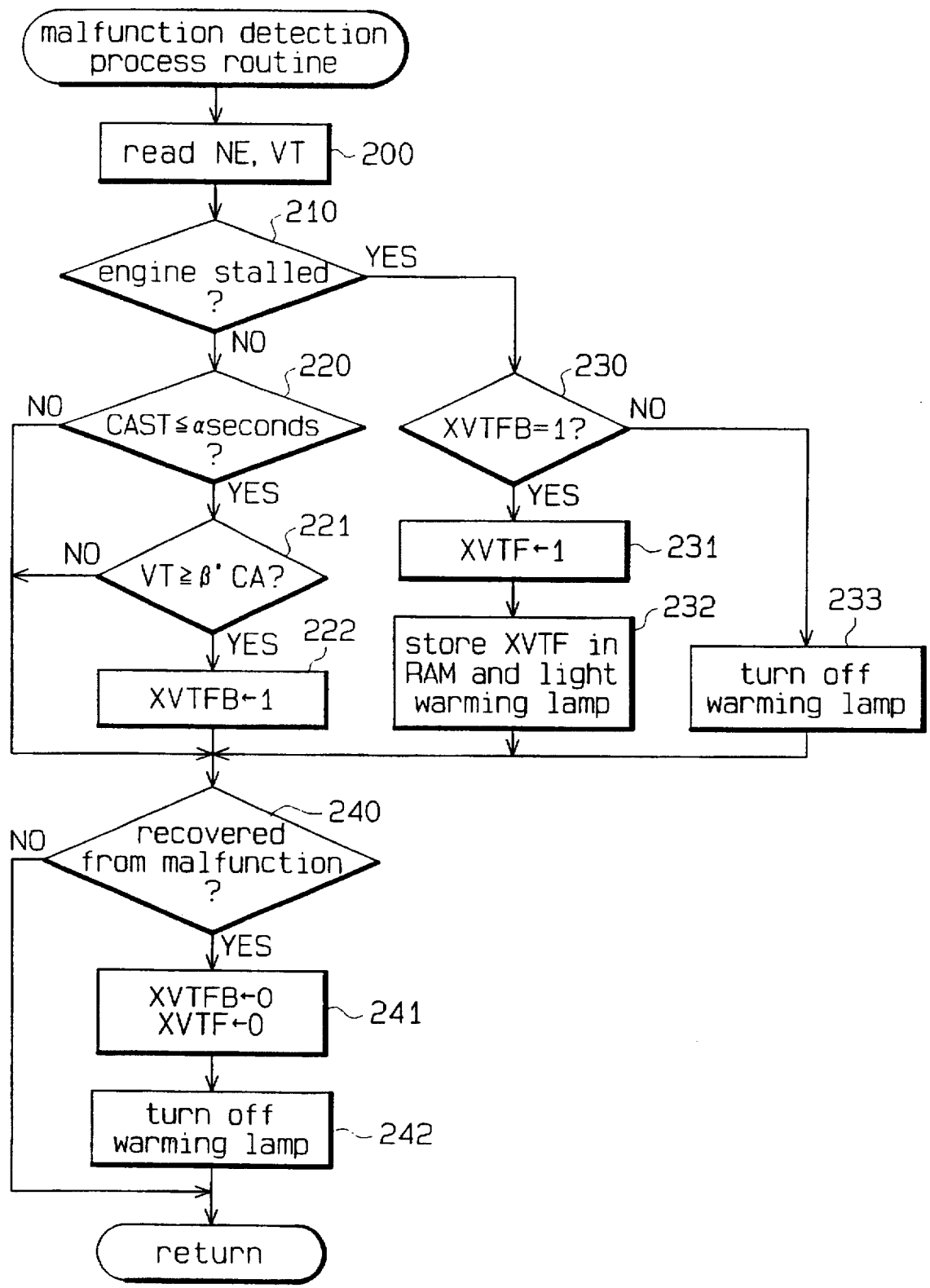
FIG. 9 is a flowchart illustrating a malfunction detection process routine.

The malfunction detection process will now be described. The flowchart of FIG. 9 shows "Malfunction Detection Process Routine." The ECU 80 executes this routine periodically for every predetermined time period.

When the ECU 80 enters this routine, the ECU 80 reads the values of the engine speed NE and the actual displacement angle VT based on the signals from sensors 76 and 78 in step 200.

In step 210, the ECU 80 judges whether the engine 1 is stalled. The ECU 80 executes this judgment by monitoring the value of the engine speed NE.

If the engine 1 is not stalled, the ECU 80 proceeds to step 220. In step 220, the ECU 80 judges whether a running time CAST is greater than a predetermined reference value α seconds. The running time CAST shows how much time has passed since the engine 1 started. The ECU 80 measures the running time CAST since the completion of the start of the engine 1. 2 to 3 seconds may be adopted as the reference value α. When the running time CAST is greater than the reference value α, the ECU 80 proceeds to step 240. When the running time CAST is equal to or smaller than the reference value α, the ECU 80 proceeds to step 221.

In step 221, the ECU 80 judges whether the value of the actual displacement angle VT detected in the current routine is smaller than the predetermined reference value β. The reference value β is an advanced angle. When the value of the actual displacement angle VT is less than the reference value β, that is, when the actual displacement angle VT is not excessively great, the ECU 80 proceeds to step 240. When the value of the actual displacement angle VT is equal to or greater than the reference value β, that is, when the value of the actual displacement angle VT is excessively great, the ECU 80 determines that the value of the actual displacement angle VT is in a specific state indicating a possibility of a malfunction of the valve timing control device. In this case, the ECU proceeds to step 222. In step 222, the ECU 80 sets a temporary malfunction flag XVTFB at one, then proceeds to step 240.

If the engine 1 has been judged to be stalled in step 210, the ECU 80 proceeds to step 230. In step 230, the ECU 80 checks whether the temporary malfunction flag XVTFB is one. If the flag XVTFB is one, there is a history that the value of the actual displacement angle VT has already been judged to correspond to the specific state described above. The ECU 80 judges that there is a malfunction of the valve timing control device based on the fact that the engine 1 is stalled and that the flag XVTFB is one. Then the ECU 80 sets a malfunction flag XVTF at one in step 231.

In step 232, the ECU 80 stores the value of the malfunction flag XVTF as a malfunction detection data in the backup RAM 84. The ECU 80 also lights the warning lamp 70 to inform the driver that there is a malfunction of the valve timing control device. The ECU 80 then proceeds to step 240.

In step 230, if the temporary malfunction flag is zero, the ECU 80 judges that there is no malfunction in the valve timing control device and proceeds to step 233. In step 233, the ECU 80 turns off the warning lamp 70. Then the ECU 80 proceeds to step 240.

In step 240, which follows either of steps 220, 221, 222, 232 or 233, the ECU 80 determines whether the valve timing control device has recovered from a malfunction by judging if there has been a change of the actual displacement angle VT. If the device has not recovered from a malfunction, the ECU 80 temporarily terminates subsequent processing. If the device has recovered from a malfunction, the ECU 80 proceeds to step 241. In step 241, the ECU 80 resets the temporary malfunction flag XVTFB and the malfunction flag XVTF at zero and then proceeds to step 242. In step 242, the ECU 80 turns off the warning lamp 70 and then temporarily terminates subsequent processing.

Figure 8:
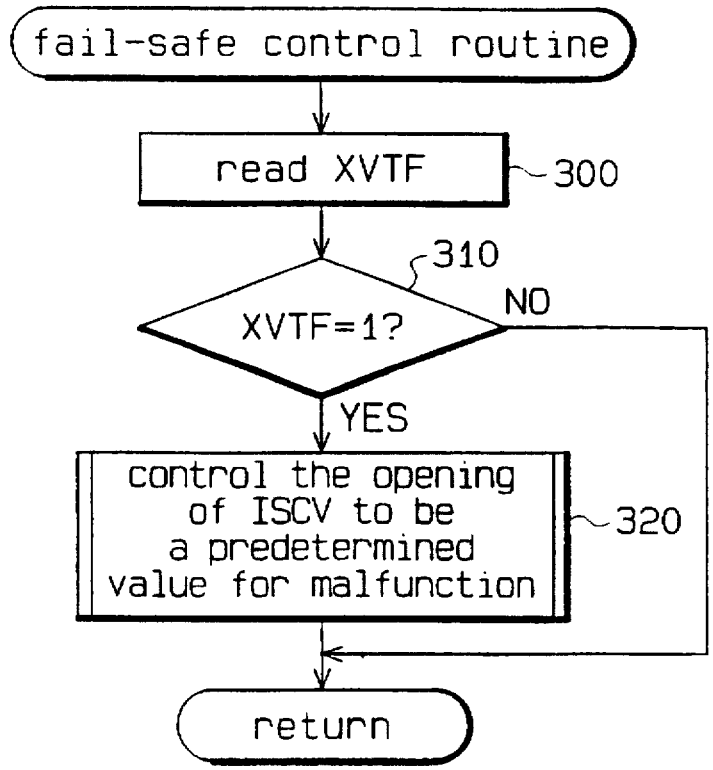
FIG. 8 is a flowchart illustrating a fail-safe control routine.

The content of the above mentioned fail-safe control routine will now be described. The flowchart in FIG. 8 shows the fail-safe control routine. The ECU 80 executes this routine periodically for every predetermined time period.

In step 300, the ECU 80 reads the value of the malfunction flag XVTF set in the malfunction detection process routine.

In step 310, the ECU 80 determines if the value of the malfunction flag XVTF is one. If the malfunction flag XVTF is one, there is a malfunction in the valve timing control device and the engine 1 has been stalled. In this case the ECU 80 proceeds to step 320. In step 320, the ECU 80 controls the opening of the ISCV 24 to approach a predetermined value which is previously stored for a malfunction. The ECU 80 then temporarily terminates subsequent processing. When the malfunction flag is zero in step 310, the ECU 80 directly terminates subsequent processing.

Therefore, when the engine 1 is restarted after being stalled, a desirable amount of external air is drawn into the combustion chamber 4 via the bypass 23 and the ISCV 24 if the throttle valve 17 is shut. This stabilizes the combustion of air-fuel mixture in the combustion chamber 4, thereby enabling the restart of the stalled engine 1.

The action and advantages of the valve timing control device and the malfunction detection apparatus with the above-described structure will be now described.

When the engine 1 is running, the intake valve 8 and the exhaust valve 9 actuate in synchronism with the rotation of the crank shaft 1a. The actuations of the valves 8 and 9 allow the respective intake port 6a and exhaust port 7a to selectively open or close, thus regulating the air intake into and discharge from the combustion chambers 4. At this time, the ECU 80 computes the value of the optimal target displacement angle VTT associated with the valve timing control by referring to the function data shown in FIG. 6. Based on the computed value of the target displacement angle VTT, the ECU 80 computes the value of the drive duty ratio DVT. Based on the value of the drive duty ratio DVT, the ECU 80 controls the LSV 55 to control the VVT 25. As a result, the valve timing of the intake valve 8 is altered to obtain the valve overlap that corresponds with the running condition of the engine 1.

When the engine speed NE is relatively high and the load LD is relatively great, the VVT 25 is controlled to increase the valve overlap. This control permits the utilization of the inertia of the air flowing through the air-intake passage 6 to enhance the efficiency of the air supply into the combustion chambers 4, thereby improving the power of the engine 1. When the engine speed NE is low and the load LD is small, the VVT 25 is controlled to decrease the valve overlap. This reduces the ratio of the internal EGR in the combustion chambers 4 to prevent the improper combustion of the air-fuel mixture. Even when the engine speed NE and the load LD have other relationships, this control device seeks the optimal valve overlap to improve the output power of the engine 1 and prevent improper combustion.

The ECU 80 detects if the engine 1 is stalled. The ECU 80 also judges if the value of the actual displacement angle VT is in the above mentioned specific state, which indicates possibility of a malfunction in the valve timing control device, that is, the ECU 80 judges if the actual displacement angle VT is excessively great. Accordingly, the ECU 80 determines that there is a malfunction in the valve timing control device when there is a history that the value of the actual displacement angle VT has been judged to correspond to the specific state and detecting that the engine 1 is stalled.

When the engine 1 is stalled by a malfunction of the valve timing control device, the malfunction can be detected after the engine 1 is stalled, that is, the ECU 80 positively detects the malfunction of the valve timing control device after the engine 1 is stalled by using a stalling of the engine 1 as a criterion. By utilizing the data of the detected a malfunction, the fail-safe control routine can be carried out even after the engine 1 is stalled.

In this embodiment, in a fail-safe control routine after the stalling of the engine 1, the ECU 80 adjusts the amount of the intake air drawn into the combustion chamber 4 by controlling the ISCV 24. This allows the stalled engine 1 to be positively restarted. One alternative for this fail-safe control routine is to restart the engine 1 while the driver is stepping on the accelerator pedal to open the throttle valve 17. However, in this embodiment the driver can restart the engine 1 without stepping on the gas pedal.

In this embodiment, the warning lamp 70, which is provided in the vicinity of the driver's seat, lights up when a malfunction of the valve timing control device is detected. This notifies the driver or passengers of a malfunction of the valve timing control device, thereby allowing them to cope with the situation.

In this embodiment, the value of the malfunction flag XVTF is stored in the back up RAM 84 when a malfunction of the valve timing control device is detected. Therefore, when checking the vehicle, the history of malfunctions of the valve timing control device can be examined by reading the malfunction data in the back up RAM 84 as necessary.

In this embodiment, the ECU 80 judges whether the value of the actual displacement angle VT is excessively great within 2 to 3 seconds from the start of the engine 1. This enables detection of a malfunction of the valve timing control device immediately after the engine 1 starts.

When the engine 1 is initially stalled by a malfunction of the LSV 55, which has stopped functioning in an open state, with the actual displacement angle VT having a value of an advanced angle, the ECU 80 detects the malfunction of the valve timing control device by detecting the stalling of the engine 1. When the engine 1 is restarted, the ECU 80 controls the opening of the ISCV 24 in a fail-safe manner. However, the hydraulic pressure provided into the hydraulic pressure chamber 49 increases abruptly immediately after the restart of the engine 1. This moves the ring gear 48, causing the actual displacement angle VT to be the most advanced angle. Therefore the valve overlap becomes maximized accordingly, resulting a increase of the internal EGR in the combustion chamber 4. This may cause a new stall of the engine 1. By detecting the second stall of the engine 1, the ECU 80 detects the malfunction of the valve timing control device again. Then the engine 1 is restarted again, the ECU 80 controls the opening of the ISCV 24 in a fail-safe manner, thereby completing the restart of the engine 1.

A second embodiment of a malfunction detection apparatus for a valve timing control device for an engine according to the present invention will be described below with reference to FIG. 10. To avoid a redundant description, like or same reference numerals are given to corresponding components of this embodiment. The following will therefore mainly discuss the differences from the first embodiment.

The content of the malfunction detection process routine of this embodiment is different from that of the first embodiment. FIG. 10 is a flowchart of the malfunction detection process routine of this embodiment.

Figure 10:
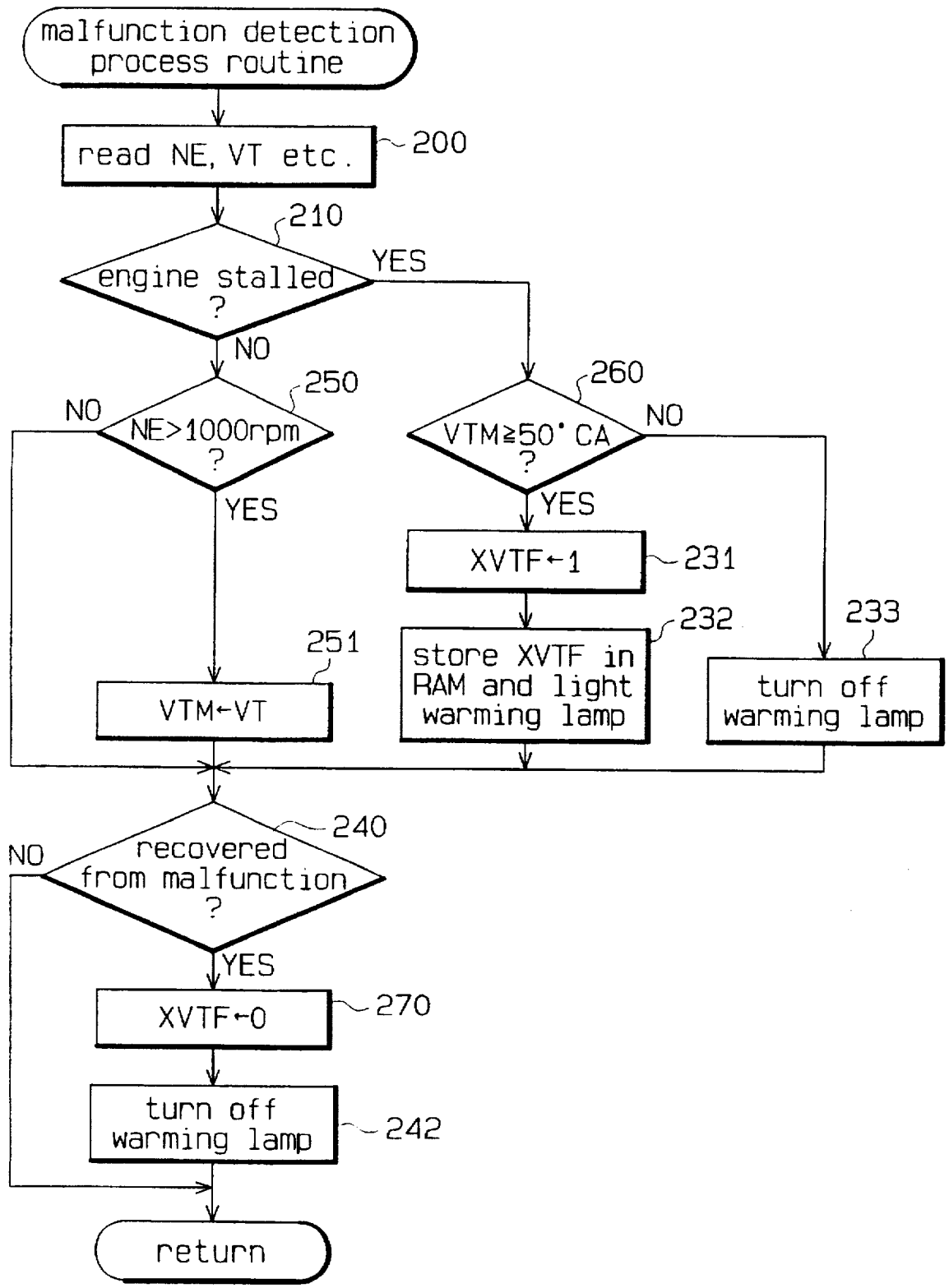
FIG. 10 is a flowchart illustrating another malfunction detection process routine.

The contents of steps 200, 210, 231, 232, 233, 240 and 242 in the routine in FIG. 10 are the same as those of the corresponding steps in the routine in FIG. 9. In the second embodiment, the contents of steps 250, 251, 260 and 270 differ from the contents of steps 220, 221, 222, 230 and 241 in FIG. 9.

If the engine is not stalled in step 210, the ECU 80 proceeds to step 250. In step 250, the ECU judges whether the engine speed NE is greater than the 1000 rpm. Setting the reference value at 1000 rpm is merely exemplary for indicating a relatively great engine speed NE. When the engine speed NE is equal to or smaller than 1000 rpm, ECU 80 proceeds to step 240. When the engine speed NE is greater than 1000 rpm, the ECU 80 proceeds to step 251. In step 251, the ECU 80 temporarily stores the actual displacement VT at the moment in the RAM 83 as a stored value VTM.

The engine is stalled in step 210, the ECU 80 proceeds to step 260. In step 260, the ECU 80 judges whether the stored value VTM of the actual displacement angle VT is equal to or greater than the 50° CA. 50° CA is merely exemplary for indicating that the actual displacement angle VT is an advanced angle. If the stored value VTM is equal to or greater than 50° CA in step 260, there is a history that the value of the actual displacement angle VT has been judged to correspond to a specific state indicating a possibility of a malfunction of the valve timing control device and detecting that the engine 1 is stalled. Accordingly, the ECU 80 judges that there is a malfunction of the valve timing control device and executes the process in steps 231 and 232.

Since the temporary malfunction flag XVTFB is not used in this embodiment, the ECU 80 resets only the malfunction flag XVTF at zero in step 270.

In this embodiment, when determining that the engine speed NE is greater than the reference value 1000 rpm immediately before detecting the stalling of the engine 1, the ECU 80 judges the value of the actual displacement angle VT corresponds to the above mentioned specific state.

Therefore, as in the case of the first embodiment, a malfunction of the valve timing control device is positively detected in this embodiment. In other words, the ECU 80 positively detects the malfunction of the valve timing control device after the engine 1 is stalled. By utilizing the data of the detected malfunction, the fail-safe program can be carried out after the stalling of the engine 1.

In this embodiment, stalling of the engine 1 is judged when the engine speed NE abruptly drops from a relatively high speed. This allows the ECU 80 to determine that the value of the actual displacement angle VT, when it is an excessively advanced angle, is the cause of the stalling of the engine. Other actions and advantages of this embodiment are the same as those of the first embodiment.

A third embodiment of a malfunction detection apparatus for a valve timing control device for an engine according to the present invention will be described below with reference to FIG. 11.

In the third embodiment, the content of the malfunction detection routine differs from that of the first and second embodiment. The flowchart in FIG. 11 shows the malfunction detection process routine according to this embodiment.

Figure 11:
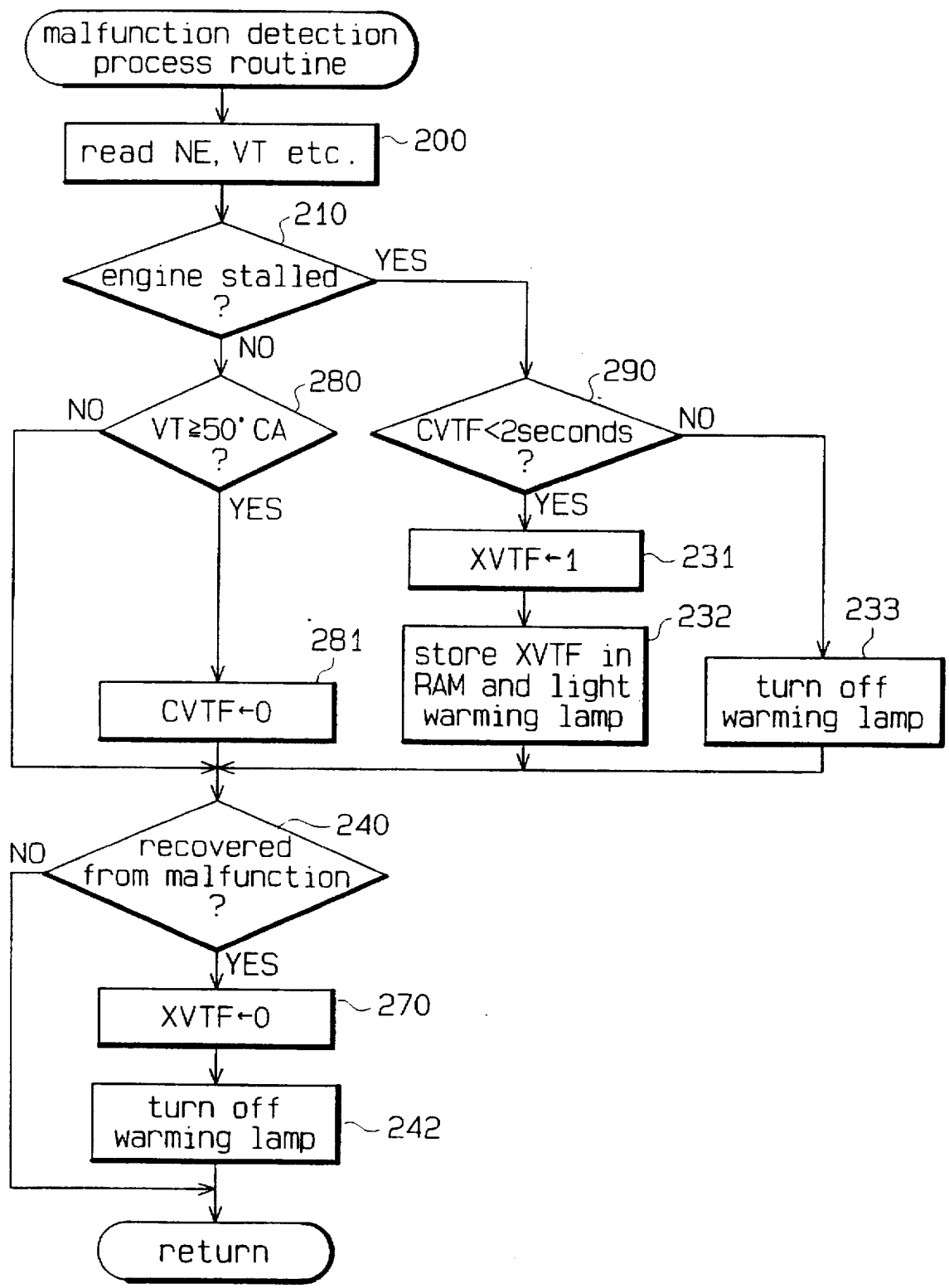
FIG. 11 is a flowchart illustrating yet another malfunction detection process routine.

The contents of steps 200, 210, 231, 232, 233, 240, 242 and 270 in the routine in FIG. 11 are the same as those of the corresponding steps of the first and second embodiments. In the third embodiment, the contents of steps 280, 281 and 290 differ from the contents of steps 220, 221, 222, 230, 241, 250, 251 and 260 in FIGS. 9 and 10.

If the engine is not stalled in step 210, the ECU 80 proceeds to step 280. In step 280, the ECU 80 judges whether the actual displacement angle VT is equal to or greater than the 50° CA. 50° CA is merely exemplary for indicating that the actual displacement angle VT is an advanced angle. If the value of the actual displacement angle VT is less than 50° CA, the ECU 80 proceeds to step 240. If the value of the actual displacement angle VT is equal to or greater than 50° CA, that is, if the value of the actual displacement angle VT is excessively advanced, the ECU 80 proceeds to step 281. In step 281, the ECU 80 resets the add value CVTF of an automatic increment counter at zero. Then the counter starts incrementing the add value CVTF from zero.

If stalling of the engine 1 is detected in step 210, the ECU 80 judges in step 290 whether the add value CVTF is less than a predetermined reference value two seconds. Two seconds is merely exemplary of a reference value indicating that the actual displacement angle VT has not been excessively great for a long time. If the add value CVTF is less than two seconds, the value of the actual displacement angle VT has just been judged to be in a specific state indicating a possibility of a malfunction of the valve timing control device. The ECU 80 judges that there is a malfunction of the valve timing control device and executes the process in steps 231 and 232.

In this embodiment, the ECU 80 judges that the actual displacement angle VT corresponds to the above mentioned specific state when the value of the actual displacement angle VT becomes an excessively advanced angle. The ECU 80 determines that there is a malfunction in the valve timing control device when judging that the engine 1 is stalled immediately after the actual displacement angle VT enters in the specific state.

Therefore, as in the case of the first embodiment, a malfunction of the valve timing control device is positively detected in this embodiment. In other words, the ECU 80 positively detects the malfunction of the valve timing control device after the engine 1 is stalled. By utilizing the data of the detected malfunction, the fail-safe program can be carried out after the stalling of the engine 1.

In this embodiment, the stalling of the engines 1 caused by an excessively advanced actual displacement angle VT can be detected without detecting the deviation of the target displacement angle VTT and the actual displacement angle VT. Other actions and advantages of this embodiment are basically the same as those of the first embodiment.

Although only three embodiments of the present invention have been described herein, it Should be apparent to those skilled in the art that the present invention may be embodied in many other specific forms without departing from the spirit or scope of the invention. Particularly, it should be understood that the invention may be embodied in the following forms:

In the first, second and third embodiments, the VVT 25, which alters the valve timing of the intake valve 8 to adjust the valve overlap, is provided only in the intake cam shaft 10. However, a VVT may be provided only in the exhaust cam shaft 11 for altering the valve timing of the exhaust valve 9 to adjust the valve over lap. Further, VVT may be provided in both cam shafts 10 and 11, respectively, for altering the valve timing of the intake and exhaust valves 8 and 9 to adjust the valve overlap.

In the first, second and third embodiments, the ECU 80 judges whether the valve timing control device recovers from a malfunction and executes a process based on the judgment. However, this process may be omitted.

In the first, second and third embodiments, the ECU 80 proceeds the fail-safe routine and controls the warning lamp 70 based on the detected malfunction of the valve timing control device. In addition to the above process and control, the ECU 80 may inhibit the valve timing control.

Therefore, the present examples and embodiments are to be considered as illustrative and not restrictive and the invention is not to be limited to the details given herein, but may be modified within the scope of the appended claims.

What is claimed is:

1. A malfunction detection apparatus for a valve control device for an engine having an air intake passage for introducing air to a combustion chamber and an air exhaust passage for exhausting gas from the combustion chamber, said air intake passage and said air exhaust passage having an intake valve and an exhaust valve respectively, the valves being alternately opened and closed with a valve timing synchronized with the rotation of a crank shaft of the engine, and said control device having a first adjusting means for adjusting the valve timing of at least one of the intake valve and the exhaust valve, a first detecting means for detecting a running condition of the engine, wherein said running condition includes rotation speed of the crank shaft as a parameter, a computing means for computing a target value representing the valve timing based on the detected running condition, a second detecting means for detecting an actual value representing the valve timing adjusted by the first adjusting means, and a control means for controlling the first adjusting means to converge the detected actual value to the computed target value so as to obtain a valve timing according to a condition of the engine, said apparatus including:

first deciding means for deciding whether a stall has occurred in the engine based on the detected running condition;

second deciding means for deciding whether the detected actual value corresponds to a specific state indicating a possibility of a malfunction related to the control device; and third deciding means for deciding that the malfunction related to the control device has occurred when the first deciding means decides that a stall has occurred in the engine, and the second deciding means decides that the detected actual value corresponds to a specific state indicating a possibility of a malfunction related to the control device.

2. The apparatus as set forth in claim 1, wherein said second deciding means decides whether the detected actual value corresponds to the specific state during a predetermined time period after a starting of the engine.

3. The apparatus as set forth in claim 2, wherein the intake valve and the exhaust valve are simultaneously opened during a period of valve overlap, and the period of the valve overlap is varied within a range between a maximum value and a minimum value, and wherein said valve timing is adjustable between two limits, and wherein said control means controls the first adjusting means to advance the valve timing of the intake valve to one of said limits to maximize the period of the valve overlap, and wherein said control means controls the first adjusting means to retard the valve timing of the intake valve to the other one of said limits to minimize the period of the valve overlap.

4. The apparatus as set forth in claim 3, wherein said first adjusting means includes:

a cam shaft rotatable in association with the crank shaft for actuating at least one of the intake valve and the exhaust valve;

a timing pulley provided on said cam shaft for transmitting torque from the crank shaft to the cam shaft;

a ring gear for coupling the cam shaft to the timing pulley to cause a rotational phase difference between the cam shaft and the timing pulley based on movement of the ring gear in an axial direction thereof; and wherein said ring gear is positioned by hydraulic pressure.

5. The apparatus as set forth in claim 4, wherein said first detecting means includes:

a first sensor for detecting the rotation speed of the crank shaft; and a second sensor for detecting the pressure in said air intake passage.

6. The apparatus as set forth in claim 5, wherein said computing means computes said target value based on said detected rotation speed of the crank shaft and said detected pressure in the intake passage.

7. The apparatus as set forth in claim 6, wherein said computing means, said control means, said first deciding means, said second deciding means and said third deciding means are included in an electronic control unit having an input signal circuit, a memory, an operation circuit and an output signal circuit.

8. The apparatus as set forth in claim 1 further comprising a second adjusting means for adjusting a running condition of the engine and a performing means for performing a fail-safe process by using said second adjusting means when the third deciding means decides that the malfunction of the control device has occurred.

9. The apparatus as set forth in claim 8, wherein said second adjusting means includes a bypass provided with the air intake passage and a control valve provided with the bypass.

10. The apparatus as set forth in claim 1 further comprising a warning means for warning of a malfunction of the control device when the third deciding means decides that a malfunction of the control device has occurred.

11. The apparatus as set forth in claim 1 further comprising a restricting means for restricting the control of the control means when the third deciding means decides that a malfunction of the control device has occurred.

12. The apparatus as set forth in claim 1, wherein said second deciding means decides that the detected actual value corresponds to the specific state when the detected rotational speed of the crank shaft is equal to or smaller than a predetermined reference value immediately before when the first deciding means decides that a stall has occurred.

13. The apparatus as set forth in claim 12 wherein the intake valve and the exhaust valve are simultaneously opened during a period of valve overlap, and the period of the valve overlap is varied within a range between a maximum value and a minimum value, and wherein said valve timing is adjustable between two limits, and wherein said control means controls the first adjusting means to advance the valve timing of the intake valve to one of said limits to maximize the period of the valve overlap, and wherein said control means controls the first adjusting means to retard the valve timing of the intake valve to the other one of said limits to minimize the period of the valve overlap.

14. The apparatus as set forth in claim 13, wherein said first adjusting means includes:

a cam shaft rotatable in association with the crank shaft for actuating at least one of the intake valve and the exhaust valve;

a timing pulley provided on said cam shaft for transmitting torque from the crank shaft to the cam shaft;

a ring gear for coupling the cam shaft to the timing pulley to cause a rotational phase difference between the cam shaft and the timing pulley based on movement of the ring gear in an axial direction thereof; and wherein said ring gear is positioned by hydraulic pressure.

15. The apparatus as set forth in claim 14, wherein said first detecting means includes:

a first sensor for detecting the rotation speed of the crank shaft; and a second sensor for detecting the pressure in said air intake passage.

16. The apparatus as set forth in claim 15, wherein said computing means computes said target value based on said detected rotation speed of the crank shaft and said detected pressure in the intake passage.

17. The apparatus as set forth in claim 16, wherein said computing means, said control means, said first deciding means, said second deciding means and said third deciding means are included in an electronic control unit having an input signal circuit, a memory, an operation circuit and an output signal circuit.

18. The apparatus as set forth in claim 1, wherein said second deciding means decides that the detected actual value corresponds to the specific state when the detected actual value becomes excessive, and wherein said third deciding means decides that the malfunction related to the control device has occurred when the second deciding means decides that the detected actual value corresponds to the specific state during a predetermined time period before the first deciding means decides that a stall has occurred.

19. The apparatus as set forth in claim 18, wherein the intake valve and the exhaust valve are simultaneously opened during a period of valve overlap, and the period of the valve overlap is varied within a range between a maximum value and a minimum value, and wherein said valve timing is adjustable between two limits, and wherein said control means controls the first adjusting means to advance the valve timing of the intake valve to one of said limits to maximize the period of the valve overlap, and wherein said control means controls the first adjusting means to retard the valve timing of the intake valve to the other one of said limits to minimize the period of the valve overlap.

20. The apparatus as set forth in claim 19, wherein said first adjusting means includes:

a cam shaft rotatable in association with the crank shaft for actuating at least one of the intake valve and the exhaust valve;

a timing pulley provided on said cam shaft for transmitting torque from the crank shaft to the cam shaft;

a ring gear for coupling the cam shaft to the timing pulley to cause a rotational phase difference between the cam shaft and the timing pulley based on movement of the ring gear in an axial direction thereof; and wherein said ring gear is positioned by hydraulic pressure.

21. The apparatus as set forth in claim 20, wherein said first detecting means includes:

a first sensor for detecting the rotation speed of the crank shaft; and a second sensor for detecting the pressure in said air intake passage.

22. The apparatus as set forth in claim 21, wherein said computing means computes said target value based on said detected rotation speed of the crank shaft and said detected pressure in the intake passage.

23. The apparatus as set forth in claim 22, wherein said computing means, said control means, said first deciding means, said second deciding means and said third deciding means are included in an electronic control unit having an input signal circuit, a memory, an operation circuit and an output signal circuit.

* * * * *

UNITED STATES PATENT AND TRADEMARK OFFICE
CERTIFICATE OF CORRECTION

PATENT NO. : 5,738,053
DATED : 14 April 1998
INVENTOR(S) : Senji KATO

Page 1 of 2

It is certified that error appears in the above-identified patent and that said Letters Patent is hereby corrected as shown below:

| Column | Line | |
|---|---|---|
| 5 | 6 | Change "1αwith" to --1α with--. |
| 5 | 52 | Change "provide" to --providing--. |
| 5 | 54 | Change "is" to --and--. |
| 9 | 5 | Change "the." to --the--. |
| 9 | 53 | Change "a optimal" to --an optimal--. |
| 12 | 39 | Before "malfunction" delete "a". |
| 13 | 13 | After "resulting" change "a" to --in an--. |
| 14 | 1 | After "judges" insert --whether--. |

UNITED STATES PATENT AND TRADEMARK OFFICE
CERTIFICATE OF CORRECTION

PATENT NO. : 5,738,053
DATED : 14 April 1998
INVENTOR(S) : Senji KATO

It is certified that error appears in the above-identified patent and that said Letters Patent is hereby corrected as shown below:

| Column | Line | |
|--------|------|---|
| 15 | 11 | Change "Should" to --should--. |
| 15 | 22 | Change "over lap" to --overlap--. |

Signed and Sealed this

Thirtieth Day of March, 1999

Attest:

Q. TODD DICKINSON

Attesting Officer

Acting Commissioner of Patents and Trademarks